(12) United States Patent
Shutic

(10) Patent No.: US 6,830,620 B2
(45) Date of Patent: Dec. 14, 2004

(54) POWDER COATING BOOTH CONTAINMENT STRUCTURE

(75) Inventor: Jeffrey R. Shutic, Wakeman, OH (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 10/211,457

(22) Filed: Aug. 2, 2002

(65) Prior Publication Data

US 2002/0185064 A1 Dec. 12, 2002

Related U.S. Application Data

(63) Continuation of application No. 09/550,353, filed on Apr. 14, 2000, now Pat. No. 6,458,209.

(51) Int. Cl.[7] .......................... B05B 5/00; B05B 13/26; B05C 15/00; E04C 1/00
(52) U.S. Cl. .................... 118/309; 118/326; 118/64; 118/634; 118/DIG. 7; 454/50; 52/309.1
(58) Field of Search .................... 118/309, 326, 118/64, 634, DIG. 7; 454/50; 52/309.1, 309.3, 796.1, 267, 783.1

(56) References Cited

U.S. PATENT DOCUMENTS

| | | |
|---|---|---|
| 3,824,912 A | 7/1974 | Jensent et al. |
| 4,375,487 A | 3/1983 | Huber |
| 4,378,728 A | 4/1983 | Berkmann |
| 4,471,715 A | 9/1984 | Gubler et al. |
| 4,574,005 A | 3/1986 | Cobbs, Jr. et al. |
| 4,661,013 A | 4/1987 | Jenkins |
| 4,715,314 A | 12/1987 | Ramseier et al. |
| 4,852,513 A | 8/1989 | Hayes |

(List continued on next page.)

FOREIGN PATENT DOCUMENTS

| | | |
|---|---|---|
| DE | 2 248 367 | 10/1972 |
| EP | 0 162 784 B1 | 11/1985 |
| EP | 0602 409 A1 | 11/1993 |
| EP | 0 588 003 B1 | 3/1999 |
| GB | 2 345 662 A | 7/2000 |
| JP | 4-122465 | 4/1992 |

OTHER PUBLICATIONS

European Search Report for Application No. EP 03 25 6607, Feb. 25, 2004.

(List continued on next page.)

Primary Examiner—J. A. Lorengo
Assistant Examiner—Y. T. Tadesse
(74) Attorney, Agent, or Firm—Calfee, Halter & Griswold LLP

(57) ABSTRACT

A powder coating booth containment structure including first and second canopy halves, each of which is a substantially nonconductive, seamless, structural composite to substantially reduce oversprayed powder particle adhesion to the booth inner surfaces. The composite canopy halves, when assembled into a spray booth additionally including either a floor or a utility base and one or a pair of end units in the form of aperture bulkheads, vestibules, or a combination of both, are structurally sufficiently strong that no external support frame is required. The composite canopy halves can each include sidewall and ceiling portions, in an embodiment, that can be connected to a floor. In another embodiment, the canopy halves each additionally include a floor portion such that they may be connected together at a floor edge and placed atop a utility base. They may be connected to the utility base. In another embodiment, the canopy halves may each further include an integral end or ends, comprising aperture bulkhead or vestibule-type end portions. Methods of assembling these embodiments are also provided that require less time than for known powder coating spray booth assembly.

12 Claims, 11 Drawing Sheets

U.S. PATENT DOCUMENTS

| | | |
|---|---|---|
| 4,902,215 A | 2/1990 | Seemann, III |
| 5,036,789 A | 8/1991 | Kelly et al. |
| 5,052,906 A | 10/1991 | Seemann |
| 5,112,663 A | 5/1992 | Morenz et al. |
| 5,169,673 A | 12/1992 | Demeny et al. |
| 5,199,989 A | 4/1993 | Thies et al. |
| 5,259,879 A | 11/1993 | Khattab et al. |
| 5,277,713 A | 1/1994 | Gelain et al. |
| 5,439,635 A | 8/1995 | Seemann |
| 5,680,670 A | 10/1997 | Adams et al. |
| 5,833,751 A | 11/1998 | Tucker |
| 6,095,715 A | 8/2000 | Hulls |
| 6,126,817 A | 10/2000 | Duran et al. |
| 6,177,368 B1 | 1/2001 | Fisher |
| 6,331,028 B1 | 12/2001 | O'Neill et al. |
| 6,444,073 B1 | 9/2002 | Reeves et al. |
| 6,458,209 B1 * | 10/2002 | Shutic .................. 118/309 |
| 2002/0072320 A1 | 6/2002 | Shutic et al. |

OTHER PUBLICATIONS

Low Cost High Quality Composite Fabrication for the General Aviation Industry.

Seeman Composite Resin Infusion Molding Process (Scrimp) Technologies.

* cited by examiner

POWDER COATING BOOTH CONTAINMENT STRUCTURE

This is a continuation of U.S. patent application Ser. No. 09/550,353, filed on Apr. 14, 2000, and issued as U.S. Pat. No. 6,458,209 on Oct. 1, 2002, for POWDER COATING BOOTH CONTAINMENT STRUCTURE, the entire disclosure of which is fully incorporated by reference.

FIELD OF THE INVENTION

The present invention relates to powder coating spray booths used for containing powder particles that do not adhere to articles intended to be coated. More specifically, the invention relates to a substantially non-conductive spray booth comprising a pair of self-supporting, one-piece, composite, seamless canopy booth halves.

BACKGROUND OF THE INVENTION

Powder spray booths for electrostatic powder coating operations are well known and are used for environmental purposes to contain oversprayed powder coating material that does not adhere to the target article. In addition, the booth facilitates collection of the oversprayed powder material which is often recycled back into the application system. In an electrostatic powder coating operation, the powder particles are charged, such as by one or more high voltage charging electrodes on an electrostatic powder spray application device, such as a spray gun, and the parts are grounded. The difference in potential creates an attraction of the powder particles to the surface of the parts. Typically, such target parts are overhead conveyed through the booth via one continuous slotted opening extending from one end of the booth through the ceiling and out the opposite end of the booth. The target parts are spray-coated therein as they pass at a controlled rate through the booth.

A powder coating booth and application system must be completely cleaned and purged of one color of powder coating material prior to a successive coating operation using a different powder color. Cleaning a powder coating spray booth can be a labor-intensive effort. In a production powder coating environment, minimizing the system down time to change from one color of powder coating material to another is a critical element in controlling operational costs. Powder material tends to get everywhere within the spray booth during a powder coating operation. During extended powder coating runs, the amount of oversprayed powder accumulated within the booth can impact color change time. Seams between booth panels and recessed ledges, such as where access doors or automatic or manual spray application devices may be located, are typically hard to clean areas and tend to hold concentrations of oversprayed powder coating material that could present a contamination risk after a color change. In addition to seams and ledges and other recesses within the booth, charged powder can adhere to booth interior surfaces.

In typical powder coating booth construction, an outer steel framework is provided for supporting individual panel members which form the roof, side and end walls of the booth. These panel members are known to be made of a thermoformed plastic, such as polypropylene, polyvinyl chloride (PVC), polyvinyl carbonate or polycarbonate. The floor may also be of thermoformed plastic or stainless steel construction. In other known embodiments, powder coating spray booths can have metallic walls, ceilings and vestibule ends, as well a metallic floor and exterior support framework.

U.S. Pat. No. 5,833,751 to Tucker is an example of a powder coating spray booth intended to reduce powder particle adhesion to the interior surfaces of the booth during an electrostatic powder spray operation. Tucker discloses a booth chamber comprising a pair of thermoformed plastic shells with smooth curvilinear interior surfaces that are intended to inhibit oversprayed powder particle adhesion. Two identical ends connect with the shells and an external support frame is disclosed, but not shown. Possible booth materials disclosed include polyvinyl carbonate and polycarbonate.

Known booth materials are available in limited sizes requiring some method of seaming to generate the overall size. These seams require much effort and cost to achieve a virtually uninterrupted, seamless surface.

In addition, known powder coating spray booths have numerous features that reduce operational efficiencies. These suboptimal features are evidenced during powder coating color changes between successive runs of different coating colors and during assembly and maintenance of the booth itself. Known powder coating spray booths use metallic external support frames and stainless steel or thermoplastic, floors, walls and ceilings. During an electrostatic powder spray coating operation, oversprayed powder material can actually be attracted and adhere to these booth interior surfaces. Higher concentrations of oversprayed powder coating material are typically seen in the immediate vicinity of the highly conductive steel frame members, which are typically grounded or are somewhat insulated from ground and could act as capacitors. Although thermoformed plastics are typically thought of as insulators, their insulative properties vary and powder particle adhesion can vary with the conductivity and resistivity of these materials. With age, conductivity of the thermoformed plastic materials can increase with corresponding increases in powder particle adhesion, as they can absorb moisture from the ambient air over time. Ultraviolet light is also known to change the physical properties of thermoplastics over time.

In addition, typical booths have numerous design features that act to increase accumulated oversprayed powder coating materials in the spray booth, thus increasing cleaning times during color change operations. In booths using panel members connected with each other and supported by an external frame, numerous seams exist throughout the booth interior that entrap oversprayed powder coating material, thereby making the booth harder to clean during a color change or routine booth maintenance. In addition to the seams, ledges are present in some powder coating spray booths on which spray gun application devices rest and are mounted, and where openings for doors and other access portals are reinforced and secured, for example. These ledges can either extend into the booth or, more typically, extend away from the inner surface of the booth. Even if otherwise angled or curved toward the floor from the typically vertical sidewalls, oversprayed powder coating material still tends to accumulate in these areas, thus making them more difficult to clean, as well.

In addition to the reduced spray booth operating efficiencies due to powder coating material adhesion as a result of electrostatics and booth design, booths constructed with frames and panel members and booths made of thermoformed plastics increase assembly and maintenance times, thus further reducing operational efficiencies. Known booths require external frames for structural support. Booths constructed of numerous individual wall and ceiling panel members must have their seams welded or otherwise sealed together. Installation of booths that require external frames for structural support of any kind increase booth installation time. Booths having multiple panels forming the walls, ceiling and floors further increase assembly time, and at best result in a semi-rigid enclosure that falls short of a preferred robust containment envelope that is suitable for industrial environments.

Maintenance of thermoformed plastic booths is also a concern and has a negative impact on efficient booth operations. With thermoformed plastic booth materials, workers and parts can accidentally nick and scratch the booth internal surfaces rather easily. These surface imperfections and discontinuities are hard to clean areas and act to entrap powder coating material therein. In addition to increased cleaning times, maintenance of the booth to remove the scratches and nicks are time-intensive at best, and results of repair activities cannot restore a surface to original condition. Both the ease at which thermoformed plastic booths can be scratched and the time involved in repairing them make thermoformed plastic booths less than ideal as a powder coating booth material.

It is desired, therefore, to provide a powder coating booth that overcomes these and other shortcomings.

SUMMARY OF THE INVENTION

The invention herein provides for an improved powder coating spray booth. In one embodiment, which is well-suited for retrofitting existing powder coating spray booths, the invention herein comprises a pair of opposed canopy halves that each have a sidewall and a ceiling portion that can be connected to each other through a radius. This radius serves to reduce color change times and functions as a torsional support element for the wall and ceiling surfaces. Each canopy half is a seamless, composite, unitary structure that can connect with an existing booth floor and with the existing booth vestibule and/or aperture end or ends, and can be separated at the top providing for a narrow overhead conveyor slot opening typical in electrostatic powder coating spray booths. The canopy halves are each self-supporting, which means they can be assembled together with an existing floor and vestibule end or ends and no external frame is required to support the powder coating spray booth of the present invention. By removing the external frame typical of all known powder coating spray booths and constructing the inventive booth canopies from nonconductive materials, the improved booth can be assembled much quicker and is more nonconductive to oversprayed electrostatic powder particles. Thus, less oversprayed particle coating material adheres to the ceiling and walls of the inventive booth. Of course, it can be appreciated by those skilled in the art that this improved embodiment of the invention can also work equally well with a new floor or vestibule end.

The canopy halves of the present invention are made from a number of non-conductive materials that are loaded onto a set-up tool having a smooth surface that has been prepared with a release agent. All the materials can be non-metallic. Typical non-conductive layers can include a first, optional, sprayed on layer of gel-coat, which is an unreinforced resin layer that is allowed to set or cure. This first layer of the booth canopy halves serves as the booth interior surface. It may be pigmented, such as with white pigment, for aesthetics and functional reasons, such as to give a clean smooth appearance and to help the worker identify the location of oversprayed powder coating material within the spray booth during booth cleaning for a color change. The specific resin material chosen is non-conductive, ultraviolet light stable and impervious to moisture adsorption, even over time. This layer can be followed by an optional layer of chopped strand mat which is a random orientation glass fiber product. Also included are three necessary layers including a core having a suitable thickness to give the canopy halves structural rigidity and a first and a second layer of knitted glass fabric sandwiching the core for strength. One or more handling tabs can be placed within the lay-up of the composite canopy halves, such as at perimeter edges or at the outer radius between the ceiling and wall portions, to assist with handling the composite canopy halves during lifting the newly formed canopy half from the tool, secondary operations in finishing the canopy half, storage, transportation and booth assembly at a production site. These handling tabs can be simple nonconductive lugs, such as of similar composite construction and already cured before placement in the lay-up.

These layers are infused with a non-conductive resin and allowed to cure, thereby forming a composite structure that is strong, lightweight, nonconductive and can be repeatably reproduced on the same tool. The infusion and curing of the resin in the layered composite booth halves are done under a bag that is sealed to the set-up tool and evacuated at room temperature in a process that removes all voids and gives repeatable results. One such process is known as Seeman Composites Resin Infusion Molding Process ("SCRIMP"). SCRIMP and improvements thereto are covered in U.S. Pat. Nos. 4,902,215, 5,052,906 and 5,439,635, all to Seeman, hereby incorporated by reference in their entirety herein.

The cured canopy halves can be lifted off the set-up tool, trimmed and have their access and other operational openings cut. A final exterior layer of gelcoat, again a pigmented or unpigmented unreinforced resin layer can be applied for aesthetics and to further inhibit moisture adsorption over time and during shipping to the production site. Alternatively, an epoxy-based barrier coat can be applied in place of the gelcoat for the same purposes. Either coating layer on the part exterior serves to effectively seal the part from the elements during shipping and fills in any pinholes that may be present on the exterior or trimmed surfaces of the composite canopy half.

In accordance with another aspect of the invention, each canopy half of the inventive spray booth can be essentially mirror images of each other and produced with the same tooling. As such, they can be shipped to the production site in a nested configuration, minimizing shipping space. In addition, each canopy half can have one or more access and other operational openings which are positioned in the canopy half during construction by measured placement of the core material, essentially removing the core material where an access opening is desired. A flange around the perimeters of the canopy halves can be provided by tapering the core layer to zero thickness and creating a flange from the remaining layers, as described above. These perimeter flanges can be used for connecting the floor and the booth ends, which can be narrowed vestibules that are known to help retain oversprayed powder coating material inside the spray booth. Alternatively, one or both of the vestibule ends can be replaced with aperture bulkheads that establish a part opening in the booth end or ends.

Access openings can similarly have such perimeter flanges, to which can be exteriorly or interiorly connected doors, application device supports, cyclone powder recovery units, and the like. Alternatively, man-door access openings and other operational openings, such as for automatic gun slots and manual gun openings, can also be located throughout the booth walls and not require the pre-established, measured core windows where the core material has been purposefully removed. The man-door access and other operational openings can be created through cut outs of the full-thickness composite, including the core material layer, with the resulting edges treated with a barrier coat during secondary operations, as described supra.

In another embodiment of the invention, each composite, seamless, unitary canopy half of the inventive booth comprises a ceiling portion, a sidewall and, additionally, a floor portion. The sidewall can connect to the ceiling and to the floor through respective radii. These canopy halves are similarly constructed as described above on a suitable tool surface and may also have one or more access openings and handling tabs. In addition, the floors of the respective canopy halves can each have a downwardly extending flange for connecting with the respective canopy half floor flange. Alternatively, the respective floor portions can be connected via a bonded shiplap type of joint or a bonded spline joint using a continuous glass fiber spline, for example. It will be appreciated by those of skill in the art that other joining methods may be used without departing from the scope of the present invention. In this inventive booth embodiment, a utility base can be included wherein the mated booth canopy halves can sit atop and may be connected thereto. Again, an existing or a new vestibule and/or aperture bulkhead end or ends can connect to the perimeter flanges of the sidewall edges of the present embodiment. In this embodiment, only one centerline floor seam exists, versus the aforementioned embodiment which connects to a separate floor, thus having two sidewall-to-floor seams that must be sealed and prior to use.

In another embodiment of the invention, a method is disclosed for assembling a powder coating spray booth. The method includes providing a pair of canopy halves that are each a seamless, nonconductive, self-supporting structure having a ceiling and a sidewall, and connecting a perimeter edge of their respective sidewalls to a floor. The canopy halves can be non-metallic. Their composite construction consists of the nonconductive layers as described in the canopy halves described above. A vestibule or aperture bulkhead end can be connected to either or both perimeter flanges of the sidewall edges of the each of the canopy halves. Assembly of such an inventive booth is less labor intensive than any known booth. No external frame is required to support the assembled booth.

In another embodiment, another method is provided for assembling a non-conductive powder coating spray booth. In this embodiment, the pair of canopy halves of the inventive method each comprise a ceiling, sidewall and floor portions. A utility base is provided and placed where desired. The respective canopy booth halves are connected to each other at a respective floor edge flange, or other joint, and placed atop the utility base. The canopy halves can be connected to the utility base. The canopy halves can have respective perimeter edge flanges along each of the common floor, sidewall, and ceiling edges and be connected to a vestibule or aperture bulkhead end or ends at either or both of the respective perimeter edge flanges. The canopy halves can be substantially nonconductive. The utility base can be made of carbon steel.

In another inventive powder coating booth embodiment, a nonconductive, self-supporting, spray booth canopy is provided that includes a pair of composite canopy halves each having a wall and ceiling portion and at least one integral vestibule end half, or aperture bulkhead half. In addition, each canopy half can have an integral floor portion with the assembled canopy halves requiring a suitable utility base section for connecting thereto. The integral floor portions of either half, or both halves may be sloped to facilitate oversprayed powder coating material collection in one or more collection troughs located below the booth floor. Otherwise, a floor is provided to connect with the canopy halves at perimeter wall and vestibule or aperture bulked edges. An overhead conveyor slot opening for passing parts through the booth can be provided. The canopy halves are nonconductive for minimizing the adherence of electrostatically charged oversprayed powder coating material to the booth interior surfaces.

Various other embodiments of the invention are described and claimed herein, and other features and advantages of the present device will become apparent from the following detailed description, with reference to the accompanying drawings and claims, which form a part of the specification.

DETAILED DESCRIPTION

Figure 1:
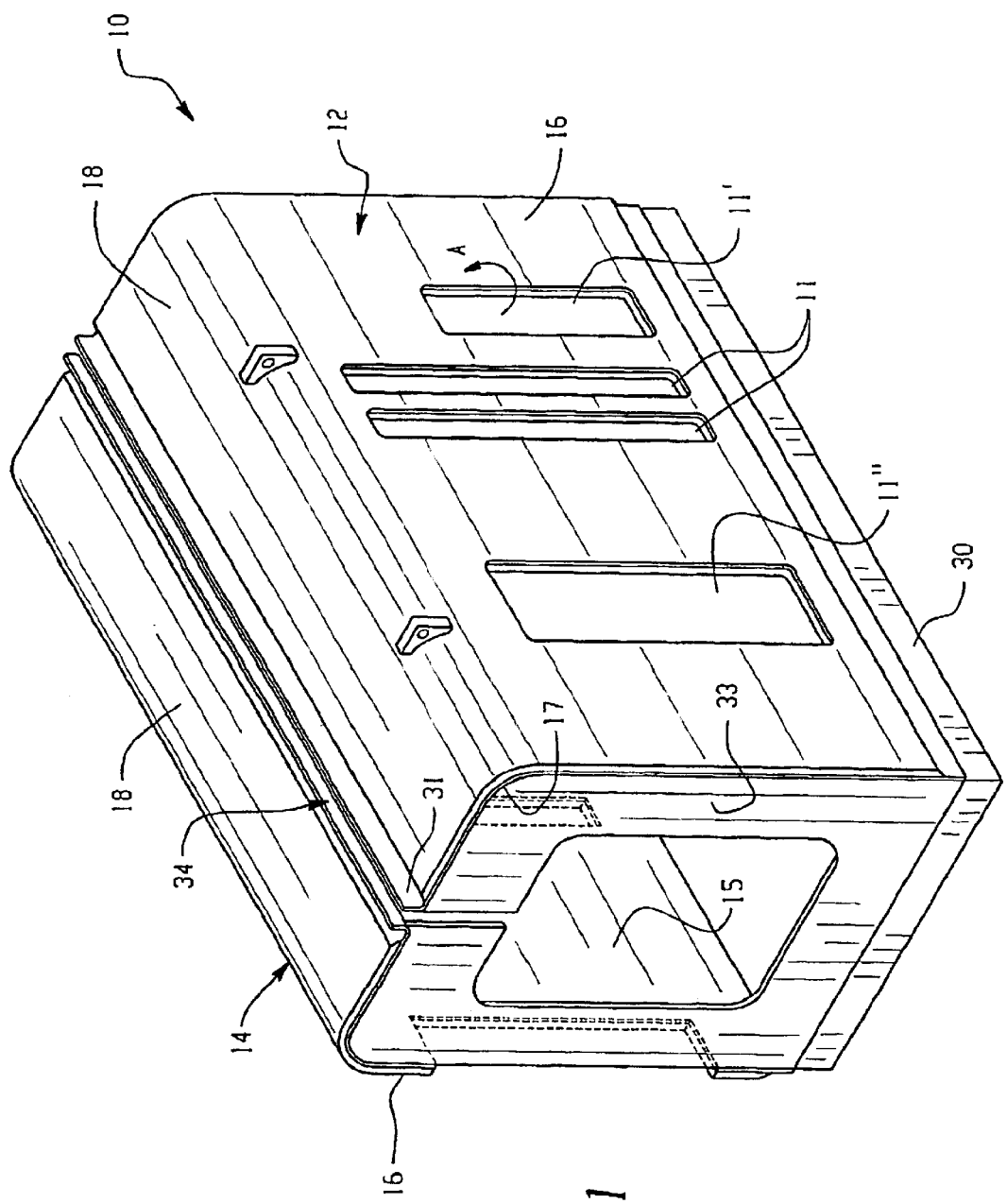
FIG. 1 is a perspective view of an embodiment of the present invention with aperture bulkhead ends.

Referring now to the figures, which are for purposes of illustrating the present invention and not for limiting same, FIG. 1 depicts a powder coating spray booth, or containment structure, according to the present invention at 10. The booth 10 is shown including a first and second canopy half, 12, 14, respectively. The canopy halves of this inventive embodiment for booth 10 are best shown in FIGS. 1, and 3 through 5. Each canopy half 12, 14 is a unitary, seamless self-supporting, composite structure. It is self-supporting in the sense that it is structural and of sufficient strength, that when assembled into the inventive spray booth, an exterior frame is not required for structural support, as in known powder coating spray booths. A single, continuous conveyor slot opening 34 is maintained at the top center of booth 10, as shown, for conveying grounded parts through the booth to be electrostatically spray coated therein, for example.

Figure 5B:
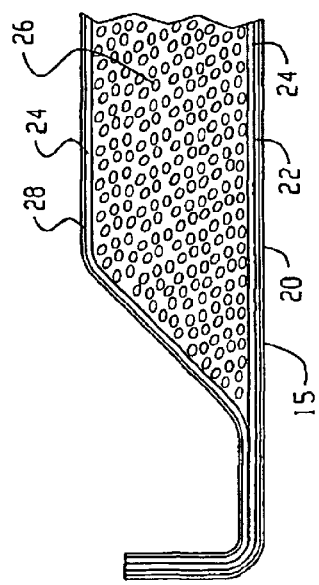
FIG. 5B is an enlarged view of Section B in FIG. 3.
Figure 5A:
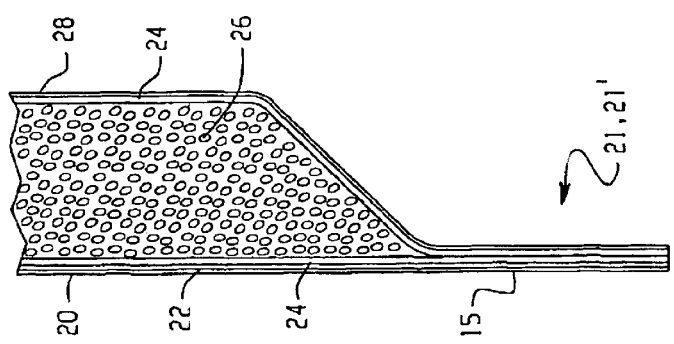
FIG. 5A is an enlarged view of Section A in FIG. 3.
Figure 5:
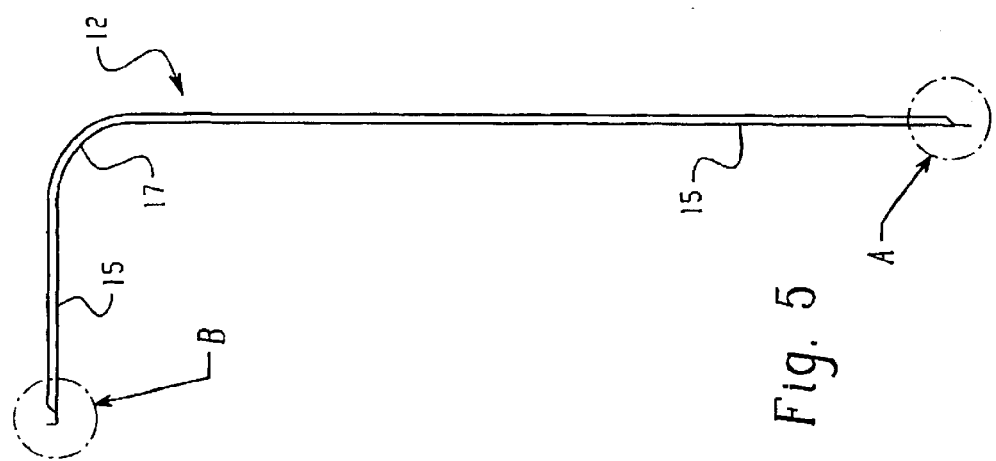
FIG. 5 is an end view of the canopy half of FIG. 3.
Figure 7:
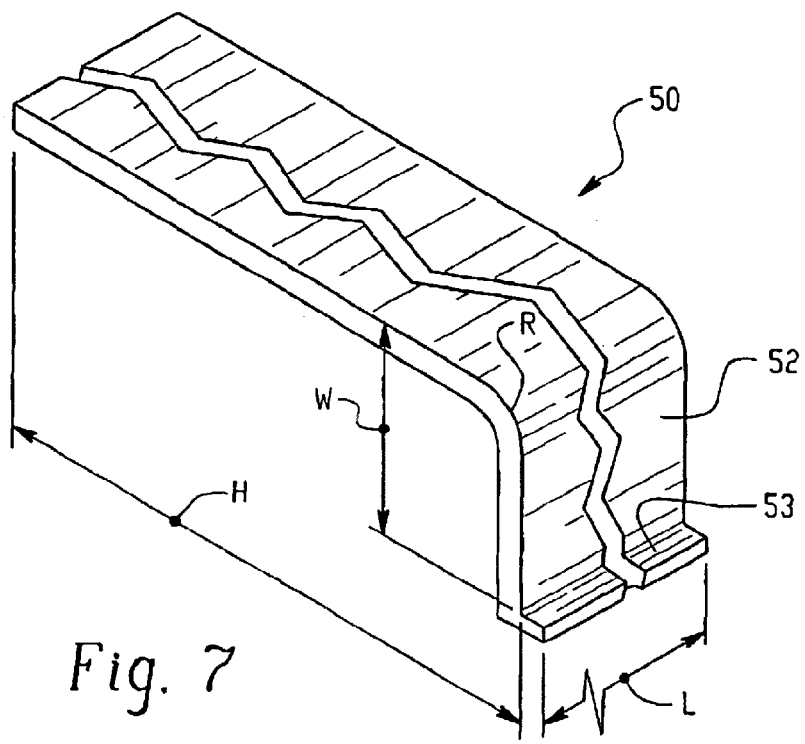
FIG. 7 is a perspective view of a set-up tool used to make the composite canopy halves of the spray booth of the present invention, as depicted in the embodiment of FIG. 1.

In the present inventive embodiment, each canopy half 12 is a mirror image of respective canopy half 14, except for the location of operational and access openings 11, 11', 11" for doors for automatic and manual spray application devices (not shown) and worker access to the booth and the like, and the optional cutouts 13 at an edge of perimeter sidewall 16 for a cyclone powder collection system, for example (not shown). As such, each canopy half 12, 14 can be made on the same tool, such as tool 50 (FIG. 7). Each canopy half 12, 14 has a sidewall 16 and an integral ceiling portion 18 connected to each other through a radius 17. Radius 17 serves to reduce color change times and functions as a torsional support element for the wall and ceiling surfaces. Each canopy half is a unitary, seamless, self-supporting, composite structure, the layers of which are best shown in FIGS. 5A and 5B.

Each canopy half 12, 14 is a seamless, self-supporting, composite structure, comprising at least three, nonconductive layers. A core material layer 26 is sandwiched between a first bi-directional glass fabric layer 24 and a second layer of bi-directional glass fabric 24. An infusion resin, or gelcoat, is drawn by vacuum throughout the composite, thereby binding together layers, 24, 26 and second layer 24, when cured, thus forming the composite canopy half 12, 14. An optional unreinforced resin, or gelcoat, layer 20, preferably of the same type as the infusion resin can serve to form the interior surface 15 of the spray booth 10, instead of the resin-infused first inner layer of bi-directional glass fabric 24. The unreinforced resin layer could be pigmented, such as with white pigment for aesthetic and functional reasons, to aid in determining where oversprayed powder coating material may be adhered during color change operations. An optional layer of chopped strand mat 22 can be positioned in the lay-up between the unreinforced resin layer 20 and the first layer of bi-directional glass fabric 24. The layers are chosen for their nonconductive properties and are chosen based on processing and material cost considerations. Each layer and the infusion resin are preferably completely non-metallic. A price-competitive, structurally self-supporting, non-conductive spray booth 10, comprising a pair of opposed seamless canopy halves 12, 14 is the result. As such, the tendency of charged powder particles to stick to booth interior surfaces is substantially reduced in electrostatic powder spray applications. It will be appreciated by those of skill in the art that substitutes may be available for each of the preferred material layers, so long as each canopy half is a non-conductive, composite structure that is seamless and does not require an outer framework for structural support. Again a known process that can be used for the room temperature resin infusion and curing operation is known as SCRIMP, and is referred to above.

In forming the composite canopy halves 12, 14 using the resin infusion process, the layers 20, 22, 24, 26 and 24 are assembled on a tool, such as set-up tool 50 shown in FIG. 7. Set-up tool 50 itself can be of composite construction comprising steel reinforcement and balsa wood coring construction for stability. Tool 50 should be of sufficient stiffness and strength to allow workers to walk upon it while loading the tool and be durable enough such that it is a reusable tool capable of lasting for the construction of numerous canopy halves 12, 14. Tool 50 can be of any sufficient length L and width W, and preferably large enough for the largest expected booth canopy half dimensions, which may be upwards of thirty feet L by twelve feet W, or even larger. In this sense, tool 50 is reusable and expandable, or universal, to construct canopy halves of various dimensions fitting within the limitations of L and W. In addition, multiple tools 50 can be laid end-to-end (not shown) to create even longer L dimensioned canopies 12, 14. In such instances, the tools 50 can be edge joined with bolts, e.g., and the resultant tool seam can be dressed with a tooling wax (joined tool 50 configuration not shown). Furthermore, tool 50 walls spanning the length L and width W can each be further expanded with an increased wall portion (not shown, but similar to alternate tool 54 shown in FIG. 8 and described below—and edge-joined as described above). Tool 50 surface 52 is finessed to a smooth finish. Materials for each canopy half are loaded onto surface 52 and built from the booth interior surface 15 outward. Each canopy half 12, 14 can be constructed on tool 50 as described below.

The first step in constructing the seamless composite canopy halves 12, 14 is to apply a release agent to smooth tool surface 52. The release agent is preferably a silicone-free release agent to ensure part release from the tool 50.

Next, and in a preferred embodiment, the optional unreinforced resin layer 20 is applied, such as by a spray application device, to surface 52 and allowed to set or cure. This resin forms the unreinforced resin, or gelcoat, layer 20, the innermost surface of which that is contacting tool surface 52 forms booth interior surface 15 of canopy halves 12, 14. This layer 20 may be of any suitable thickness, such as from about 0.01 inches to about 0.1 inches, or even greater, but preferably from about 0.025 inches to 0.035 inches thick to provide a durable lightweight surface layer. The gelcoat, or unreinforced resin, layer 20 can be pigmented, such as with white pigment, for aesthetic and functional reasons. The smooth hard white surface is easier for workers to see oversprayed powder that is adhering to booth interior canopy surfaces 15 and must be cleaned during a color change operation. Gelcoat layer 20 forms a durable interior surface that is impervious to moisture adsorption and does not degrade over time or due to ultraviolet light. In addition, it is impact and scratch resistant and scratches that do form can be easily buffed out. Suitable resins for gelcoat layer 20 in this electrostatic environment are those that cure into nonconductive, resilient, moisture impervious layers, such as an epoxy-based resin system or a vinyl ester resin system. Derakane 441-400 from Dow Corporation, and CoREZYN VEX 169-540, from Interplastic Corp. of St. Paul, Minn., are exemplary of suitable vinyl ester resins for this purpose.

An optional, but preferred second layer 22 comprises chopped strand mat. Chopped strand mat is a well-known random orientation glass fiber composition. Although a commodity product with various weight densities and manufacturers, a 1.5 ounce E-glass chopped strand mat from Owens Corning is sufficient for these purposes and is substantially non-conductive. The chopped strand mat layer 22 has both aesthetic and functional purposes. The chopped strand mat layer 22 serves as a veil thereby preventing the next layer 24, which is bi-directional glass fabric, from showing through the unreinforced resin, or gelcoat, layer 20 in what is commonly referred to in the art as "print-through." The chopped strand mat reduces the possibility of print-through. In addition, by spraying the chopped strand mat layer 22 on wetted with the infusion resin, a more durable surface is created. The infusion resin is preferably the same as that forming layer 20, but may be slightly more viscous, depending on the styrene content. Such a surface can be walked upon by workers, preferably wearing protective booties or overboots, when loading the remaining layers 24 and 26. The chopped strand mat layer 22 will take up shear and torsional loads such as that applied by a worker's foot when turning, thereby preventing defects to the unreinforced resin layer 20 underneath, such as lifting off of the unreinforced resin layer from the tool surface 52 under such shear and torsional loads.

Next, workers apply a first layer 24 of knitted bi-directional glass fabric that adds strength to the composite when cured. As mentioned above, the workers can walk upon the partial lay-up when applying the layer 24 of bi-directional glass fabric, or they can be suspended above the surface or access the surface by properly placed scaffolding (not shown). A suitable material choice and weight is CM 3610 knitted bi-directional E-glass. This is a nonconductive commodity product with various manufacturers. Brunswick Technologies Inc. is one such suitable manufacturer. It is appreciated that other weights of knitted or woven reinforced glass fabrics of varying mesh sizes may be equally suitable for this structurally reinforcing, yet nonconductive layer 24.

Next, workers load the core material layer 26. Again, the material chosen must be nonconductive and possess appropriate physical properties to ensure structural rigidity. A suitable core material for this purpose has been found to be the family of semirigid, closed cell, polyvinyl chloride (PVC) foams. Again, these are non-conductive commodity products. Baltek Corporation's AirLite™ B-6.25 in one inch thickness has been found suitable for this purpose. This foam has a density of 6.25 pounds per cubic foot. Denser foams may be used throughout the composite structure, or at key locations, such as for the floor portions 19 (see FIGS. 2 and 6) or near the operational and access openings 11, 11', 11". Of course it will be appreciated by those of skill in the art that any number of other closed cell foams or other nonconductive core materials may work for this specific electrostatic application. In addition, varying thicknesses and core material densities may also work equally well for this nonconductive usage. The foam core material can have spaced holes for the resin to timely flow through during the infusion process, as described above. These holes can preferably be mechanically placed perforations in a desired spacing and pattern. Suitable perforation spacing will vary based on the foam thickness and the viscosity of the infusion resin, for example. One eighth inch diameter perforations spaced on two inch centers in an echelon grid pattern is sufficient for these purposes.

During the core material placement, or loading of the core material layer 26, by the workers, operational and access openings 11, 11', 11" for doors, automatic and manual spray application devices, worker access to the booth and the like are placed and determined by removing the foam layer in these areas. Preferably, the operational and access openings 11, 11', 11" will have perimeter edge flanges 21 defining the openings in the canopy halves 12, 14. These edge flanges 21 may be formed by tapering the foam core material layer 26 to zero thickness from its full thickness, through a taper, such as a forty-five degree taper, for example. As such, there will be a transition region, or zone, in the finished composite canopy halves 12, 14, wherever the foam core thickness tapers from full thickness to zero thickness at a first inboard edge of a flange 21, 21', 21". The flanges, therefore, are typically composed of all layers excepting the core material layer 26, comprising namely, an unreinforced resin layer 20, a layer of chopped strand mat 22, and two layers of bi-directional glass fabric 24, all of which are bound together with a resin into a composite structure that is integral with the canopy halves 12, 14. See FIGS. 5A and 5B. Alternatively, the flanges 21 around the operational and access openings 11, 11', 11" can be omitted. Operational and access openings 11, 11', 11" can be made using the 6.25 pounds per cubic foot, or higher density, foam all the way to the edges of the desired openings 11, 11', 11" thereby reducing production time by eliminating the layout and cutting of the core material 26 during tool loading. The openings 11, 11', 11" would be cut in secondary operations and the cut edges treated with a barrier coating 28 (FIG. 1A), for example, as described below.

FIG. 5A shows edge flanges 21 that are also typical of edge flanges 21' for connecting the composite canopy halves 12, 14 to the floor 30 at the bottom 23 of sidewalls 16, or the edge flanges 21" that are for connecting to a vestibule end 32 at edges 25 of sidewalls 16 and ceiling portions 18. In addition, the flanges 21 shown at FIG. 5A are typical for perimeter flanges 21 found around the operational and access openings 11, 11', 11" and for optional cyclone openings 13.

FIG. 5B shows a flange 31 that is a ninety degree flange. Flange 31 is at the peripheral edge of the ceiling portion 18 of each canopy half 12, 14 and the upstanding leg of flange 31 serves to define the conveyor slot opening 34 in the assembled booth 10. Functionally, the opposed pair of flanges 31 serve as a bumper guard for the conveyor, thereby preventing damage to the canopy halves 12, 14 by parts or conveyor hooks (see 70 and 62 in FIG. 9, for example) for attaching to parts that may accidentally sway and contact the canopy halves 12, 14.

Figure 2:
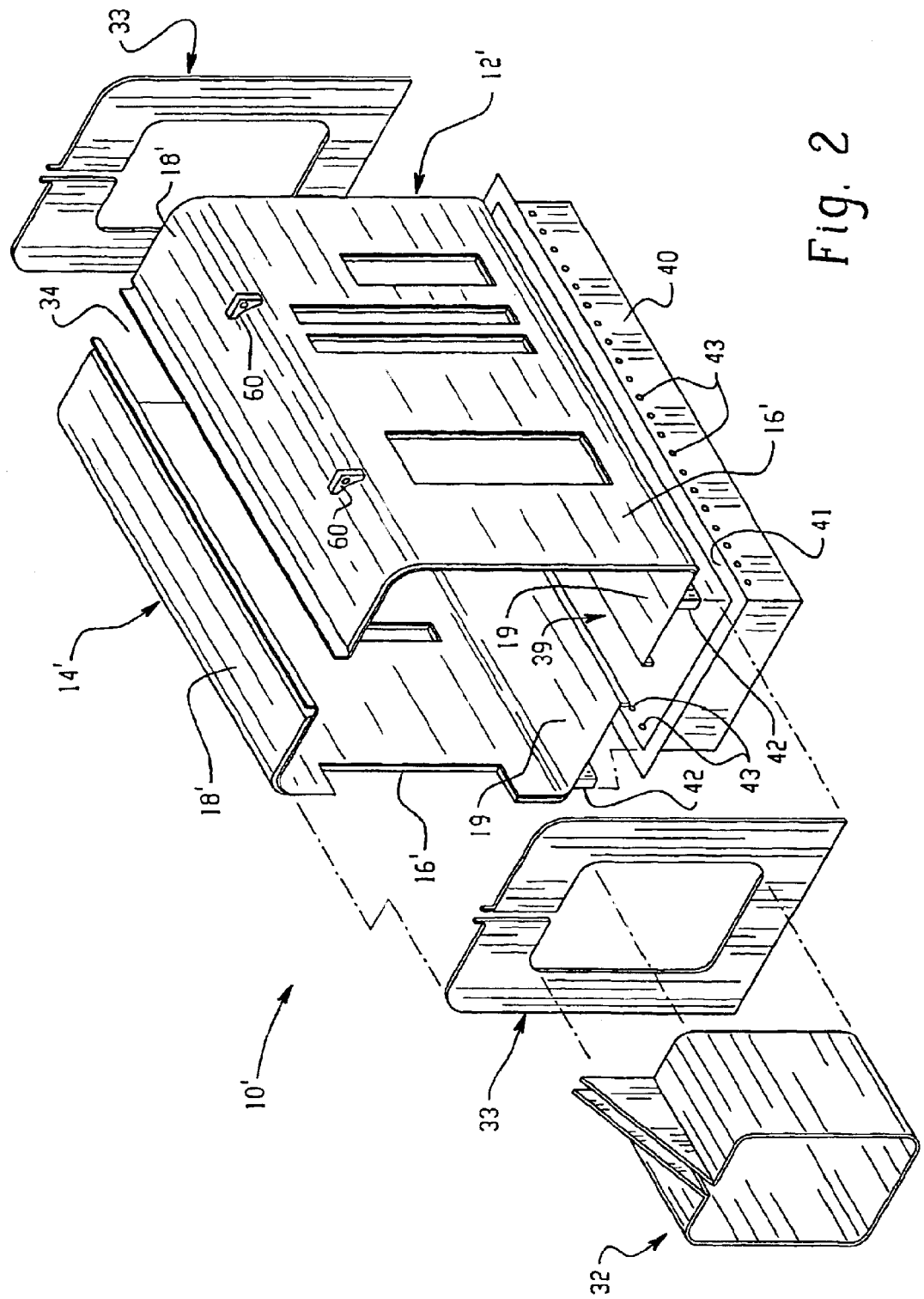
FIG. 2 is an exploded perspective view of an alternative embodiment of the present invention depicting one each aperture bulkhead and vestibule ends.
Figure 3:
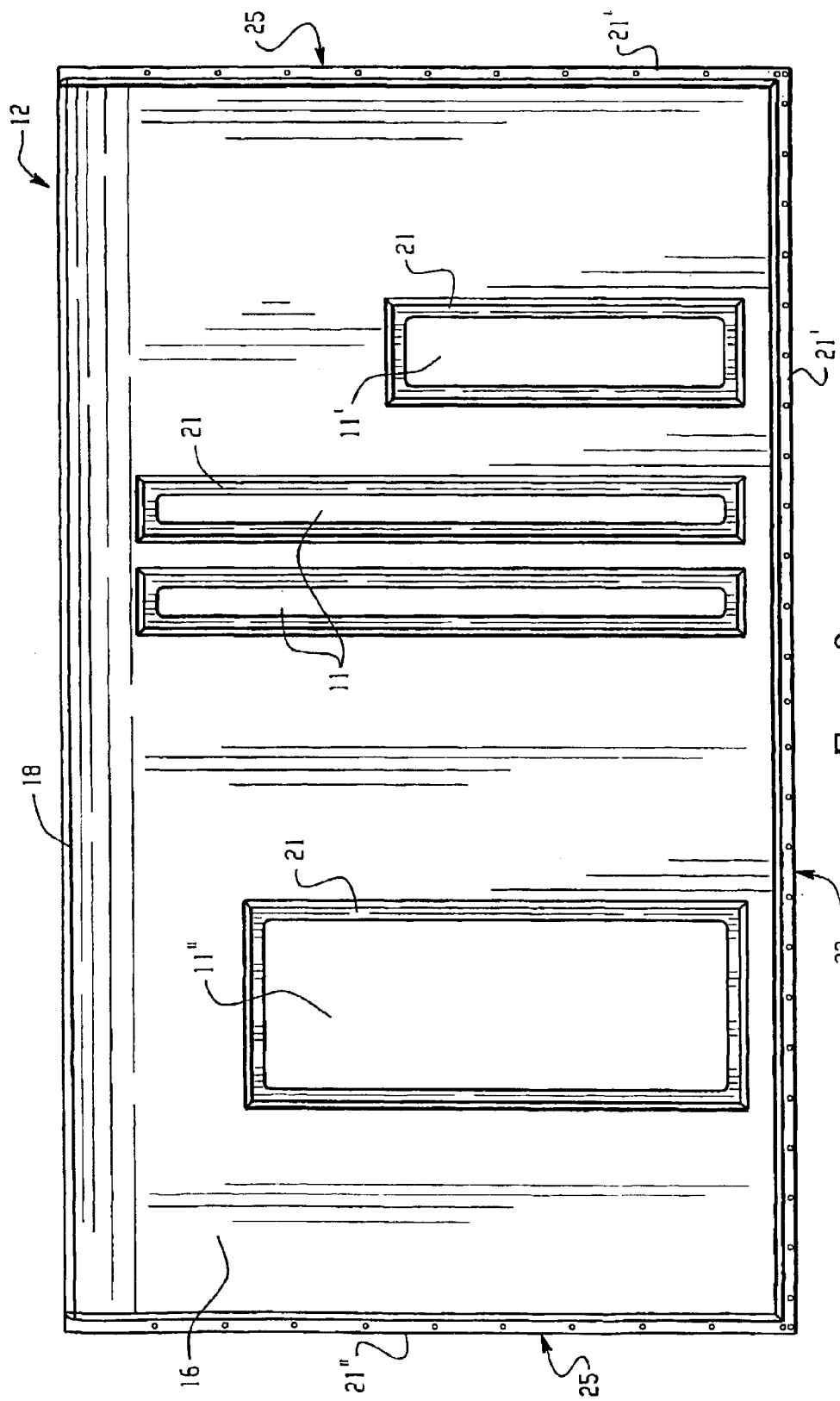
FIG. 3 is side view of a canopy half of FIG. 1 depicting typical solid edge, flanged access and operational openings.
Figure 4:
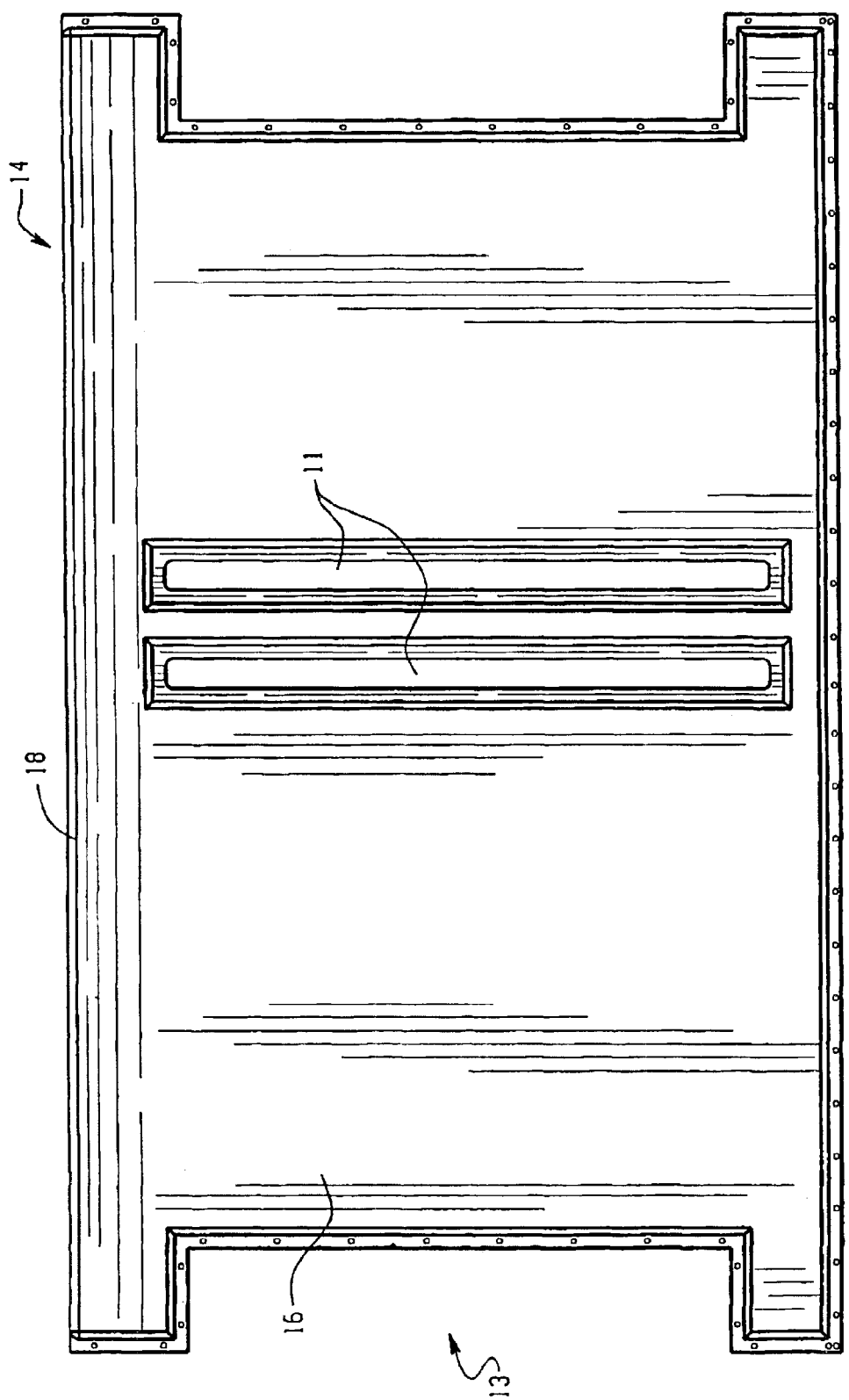
FIG. 4 is a side view of the canopy half of FIG. 1 opposed to the canopy half of FIG. 3, shown with sidewall edge cutouts for connecting with a cyclone powder collection system, and similarly depicting solid edge operational openings.
Figure 9:
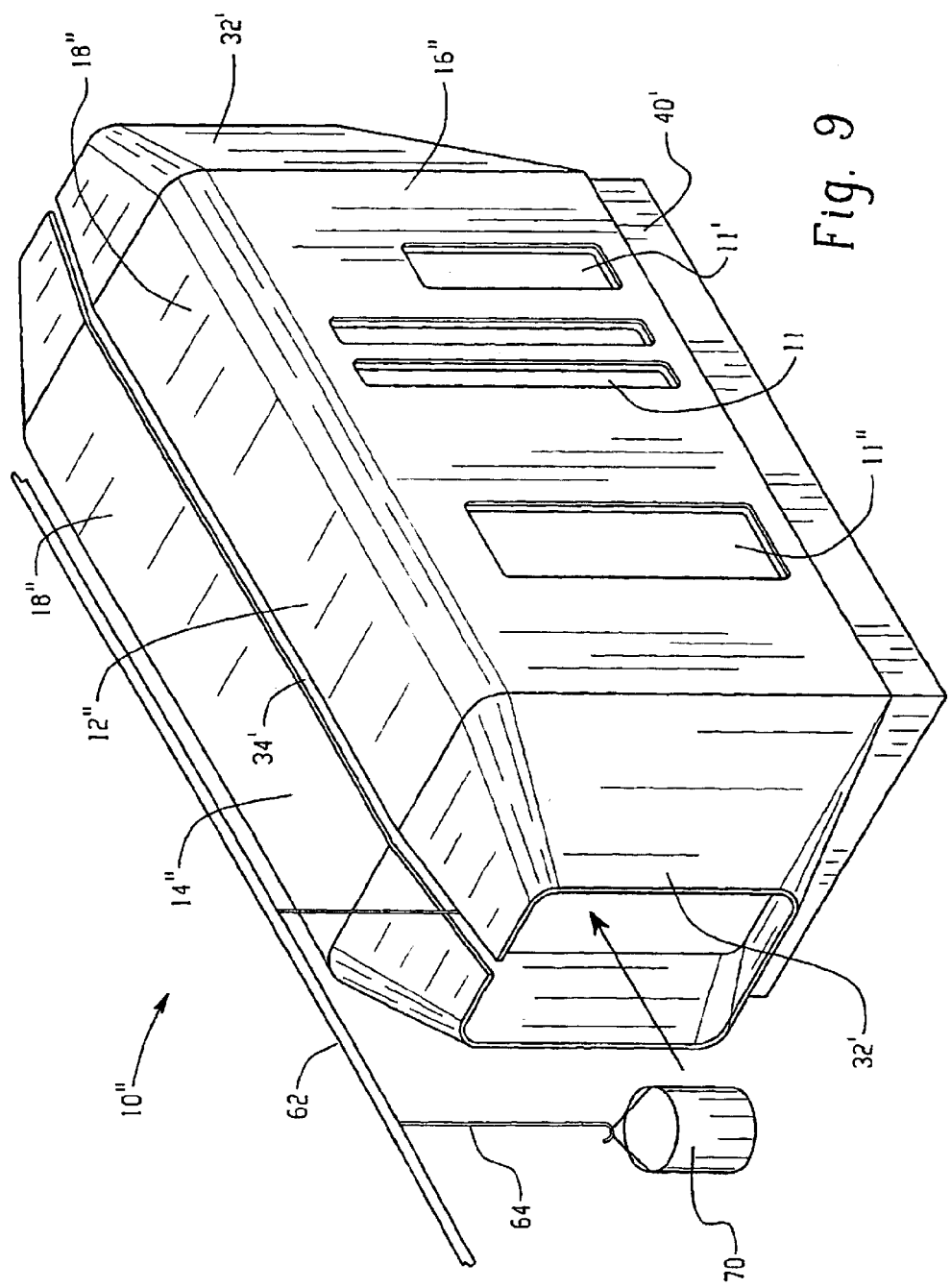
FIG. 9 is a perspective view of an alternative embodiment of the present invention.

After the foam core layer 26 with associated perimeter flanges 21, 21', 21" and 31 are in place, a second layer of bi-directional glass fabric 24 is laid over top of the foam layer 26 and associated flanges 21, 21', 21" and 31. Again, this layer can be identical to the first layer 24 of bi-directional glass fabric and serves to strengthen and give structural rigidity to the finished composite canopy halves 12, 14. It should be noted that optional hard points, or handling lugs or tabs 60, preferably in the form of nonconductive, already cured composite construction, can be placed in the lay-up where desired, prior to this second layer of bi-directional glass fabric 24 being applied. These handling lugs or tabs 60 are shown on canopy half 12' in FIG. 2, and may be placed where desired in the lay-up, thereby forming a part of the composite structure therewith to assist with later handling, transportation and set-up of the pairs of canopy halves 12, 14, 12', 14' (FIG. 2) and 12", 14" (FIG. 9). Preferably, two or more handling tabs 60 are placed on the canopy half (as on 12' in FIG. 2) near the center of gravity of the canopy half such that the canopy half is held with the sidewall 16, 16' substantially vertical to assist with installation to the floor 30 (FIG. 1) or the opposed canopy half 14' and utility base 40 (FIG. 2).

The SCRIMP process, already incorporated by reference, supra, via U.S. Pat. Nos. 4,902,215, 5,052,906 and 5,439,635, all to Seeman, or another resin-infusion process, is now applied to the lay-up. Briefly stated, a layer of disposable porous plastic peel-ply is placed over top the lay-up and loaded tool 50. This is followed by laying resin distribution media and delivery lines, which are connected to a resin source, as desired over the peel ply. A vacuum is connected by a line or lines that typically extend so that they pull a vacuum near the peripheral edge, or edges of the canopy half 12, 14 lay-up. A plastic or mylar bag, or sheet (not shown), is laid over this entire lay-up and sealed to the tool 50, such as by using double-back Tacky Tape® from Schnee-Morehead Inc. The resin distribution lines and vacuum lines that must extend under the mylar sheet are first wrapped with the Tacky Tape® which is then secured to the sheet and the tool 50 (not shown).

Next the sealed bag and loaded tool 50 are evacuated via a vacuum pump (not shown). The vacuum can be checked by timing the evacuation and turning the vacuum pump off to see if the vacuum is lost. If a good seal is in place, the vacuum pump is turned back on and the infusion resin is allowed to be drawn into the resin distribution lines and media, through the peel ply and through the entire lay-up on loaded tool 50. The infusion resin is drawn through the lay-up and fills all voids, including through the perforations in core layer 26, both layers of bi-directional glass fabric 24 and the optional chopped strand mat layer 22 all the way to the optional cured unreinforced resin layer 20. As nature abhors a vacuum, the infusion process occurs rather swiftly. Typically, the vacuum may be drawn to about twenty-seven inches of Mercury. It takes about twenty-five to thirty minutes for the infusion resin to fill a 250 square foot part by occupying all voids in the reinforcement products and coring and another twelve hours to cure at room temperature. No autoclave is required. Obviously, resin infusion and curing time depends on the part size and thickness and ambient or room temperature. The vacuum is maintained throughout this time.

Figure 1A:
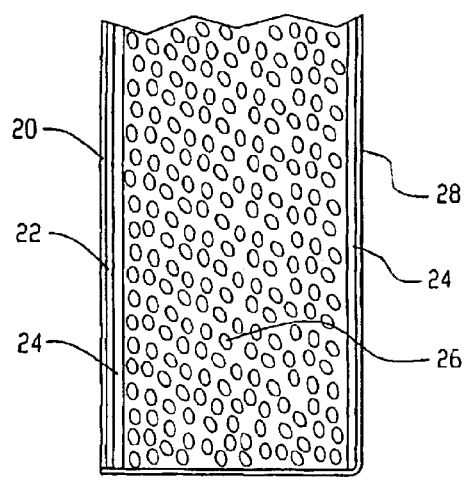
FIG. 1A is an enlarged view of section A in FIG. 1 depicting a core-edge, full thickness operational opening.
Figure 1B:
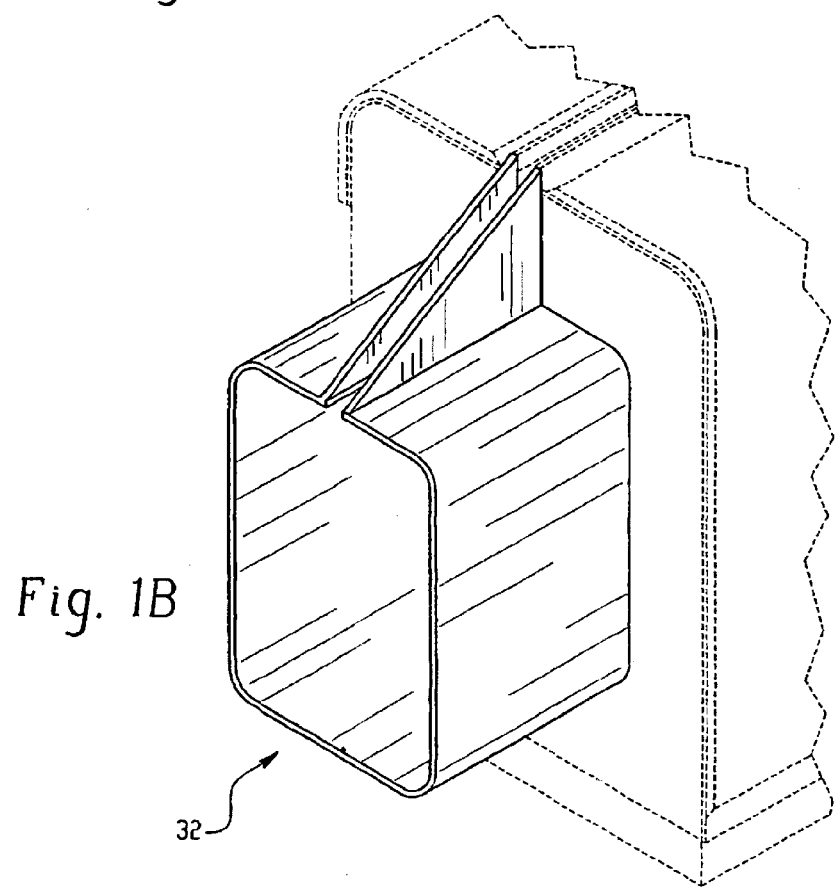
FIG. 1B is a partial view like that of FIG. 1, with the aperture bulkhead end replaced with a vestibule end.

Once the resin is cured, the resin and vacuum lines are detached, the peel ply and resin distribution lines and media are removed and disposed of. The partially finished canopy half 12 or 14 is lifted off tool 50, such as by a simple overhead crane (not shown) connecting to handling tabs 60, for secondary operations. Secondary operations include trimming perimeter edges and cutting out operational and access openings 11, 11', 11" while leaving the desired flanges 21 surrounding them. This can be accomplished preferably using a template that is suction clamped to the finished interior surface 15 of unreinforced resin layer 20 and using a manual or automatic router cut out the composite around the inside of the template (not shown). Alternatively, and as mentioned above, operational and access openings 11, 11', 11" can be cut from the full thickness composite including the core material layer 26, as shown in FIGS. 1 and 1A, leaving an exposed core edge for the operational or access openings 11, 11', 11" that would be treated with a barrier coating 28 in secondary operations. In addition, optional cutouts 13 at an edge of perimeter sidewall 16 for a cyclone powder collection system can be trimmed open, thereby leaving corresponding solid edge flange 21". If desired, it should be noted that within one or more of the operational and access openings 11, 11', 11", such as the large access door 11" for worker entry into the booth, a destructive test sample or samples can be made by simple placement of all layers 20, 22, 24, 26 and second layer 24, over a section of the eventual access opening 11" during lay-up, which would be resin-infused and cured with the booth half 12 or 14. When the access door opening 11" is routed out in secondary operations as herein described, the test article can be further trimmed and destructively tested for sufficiency of bonding, mechanical properties, electrostatic properties and general quality control, for example.

As a final step in secondary operations prior to readying for shipment, an exterior barrier coat layer 28 is applied. Barrier layer 28 can be either a layer of epoxy-based, nonconductive barrier coat, or a layer of nonconductive unreinforced resin, similar to, or the same as, that of layer 20. This will fill any possible pin holes that may be exposed through the cured resin-infused outer layer 24 of bi-directional fabric and creates a further moisture impervious layer serving to further prevent moisture intrusion to the composite. In either case, the barrier coat 28 will typically be thinner than layer 20, such as having a thickness on the order of from about 0.003 to about 0.009 inches, in a preferred example. In addition, it may be pigmented white for aesthetics, since it serves to form the outer layer of the booth canopy halves 12, 14. The outer barrier coat 28 also serves to seal all trimmed edges, including those of all perimeter flanges 21, 21', 21" and 31.

An inventive method of assembly of powder spray booth 10 is herein provided. The method of assembly is straightforward and less time-consuming than assembly for any known powder coating spray booths. Workers simply unload the canopy halves 12, 14, each having a ceiling portion 18 and an integral sidewall portion 16, hold them in place above an existing floor, or a new floor, 30 and attach the lower flanges 21' of each canopy half 12, 14 to the floor assembly 30, such as with bolts through corresponding holes spaced along the flanges 21' and the floor assembly 30. Next, a vestibule end 32, which again can be either existing, such as in a retrofit assembly, or new, is connected similarly with bolts (not shown) to edge flanges 21" around the sidewalls 16 and ceiling portions 18 of respective canopy halves 12, 14 and to floor assembly 30. An optional second vestibule end 32 can be similarly connected to the opposite perimeter edge of canopy halves 12, 14. Again, corresponding holes in the perimeter flanges 21" of respective ceiling portions 18 and sidewalls 16 of canopy halves 12, 14 would be bolted to holes in the vestibule end 32. Assembly bolts may be non-conductive glass-reinforced plastic bolts or steel. Assembly seams exposed to the booth 10 interior could be sealed, as is known in the art. No exterior framework is necessary for booth 10, since the composite canopy halves 12, 14 are structurally self-supporting, that is, they are strong enough to hold their own weight and are able to support application devices (not shown) within, or attached to, operational openings 11, 11', for example.

Figure 8:
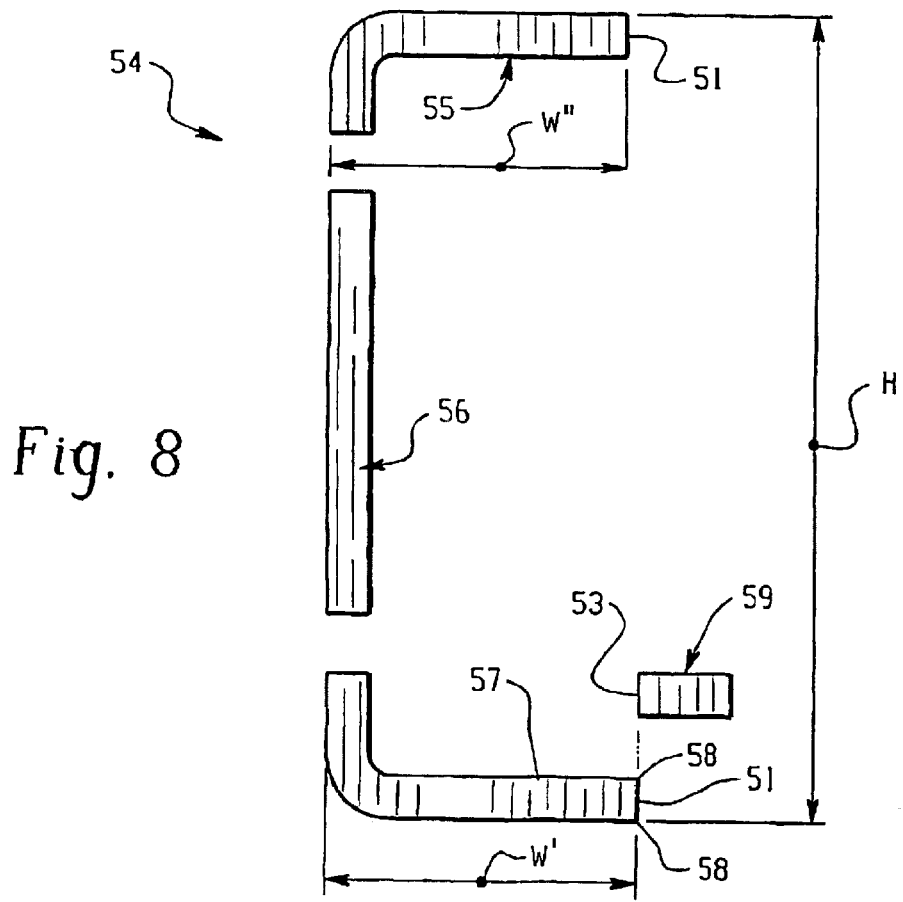
FIG. 8 is a side view of an alternative set-up tool that can be used to make canopy halves as shown in FIG. 2, for the present invention.

An alternative embodiment of the inventive spray booth 10' is shown in FIGS. 2, 6, 6A and 6B. The same reference numbers will be used for booth 10' where appropriate and where similar structure is depicted from similarly referenced items in booth 10 of FIGS. 1, and 3–5. As such, booth 10' comprises two one-piece composite canopy halves 12', 14', each comprising a ceiling portion 18, a sidewall portion 16' and a floor portion 19. A single, continuous conveyor slot opening 34 is similarly maintained at the top center of booth 10', as shown, for conveying grounded parts through the booth to be spray coated therein, such as by one or more electrostatic spray application devices (not shown). Canopy halves 12', 14' are constructed similarly to canopy halves 12, 14, as detailed above. They comprise the same materials and layers, namely optional layers 20 and 22 and first and second layers 24 sandwiching core material layer 26, as well as optional barrier coat layer 28 applied in secondary operations off the production tool 54 (FIG. 8). Layer 20 can similarly serve as the interior surface 15' of booth 10'. Again, canopy halves 12', 14' can have one or more optional hard points, or handling lugs or tabs 60, preferably of nonconductive, already cured composite construction, that can be placed in the lay-up where desired. The canopy halves 12', 14' are similarly one-piece and seamless and of nonconductive and, preferably non-metallic, composite construction.

Figure 6:
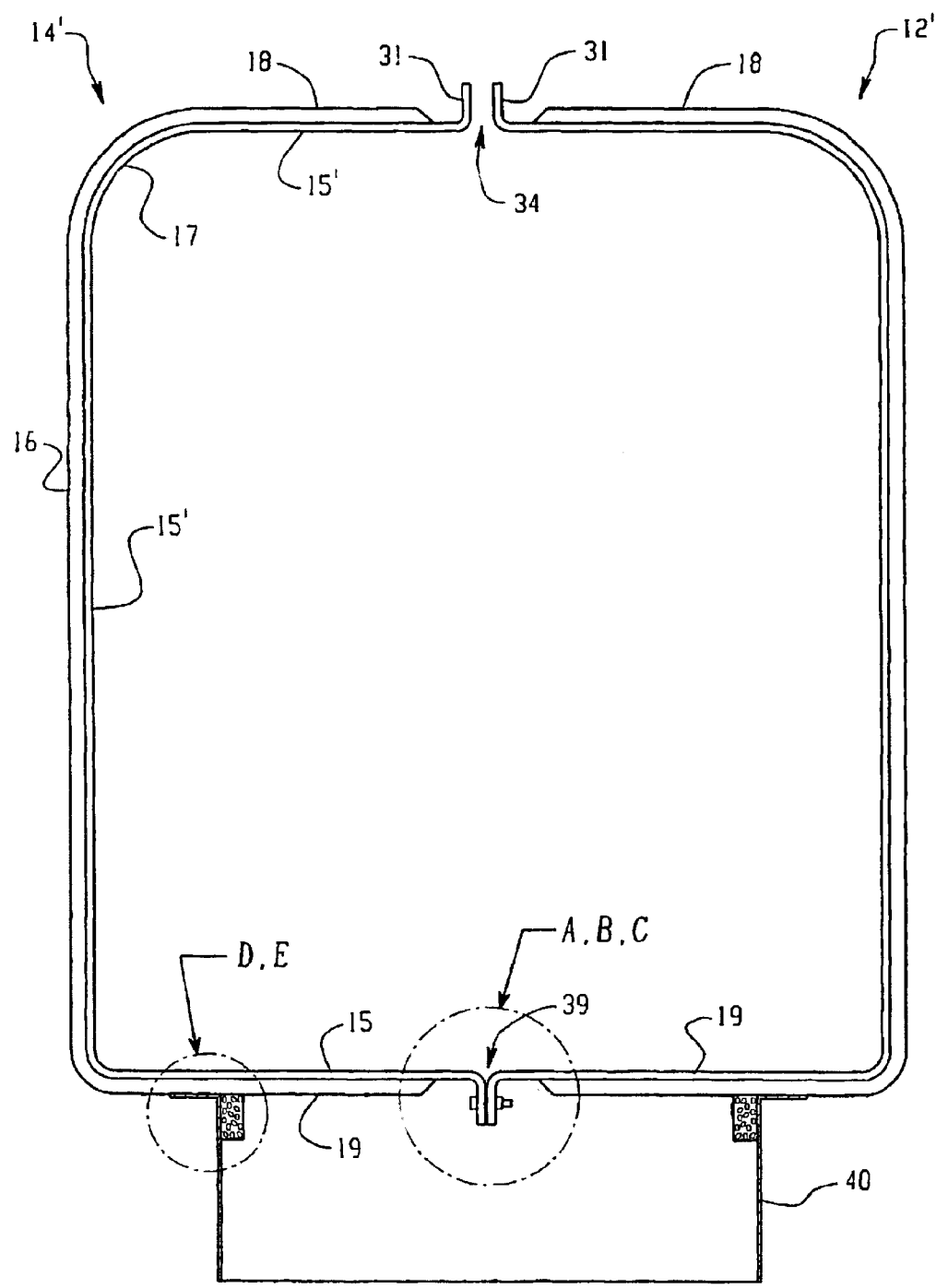
FIG. 6 is an end view of a canopy half of FIG. 2.
Figure 6A:
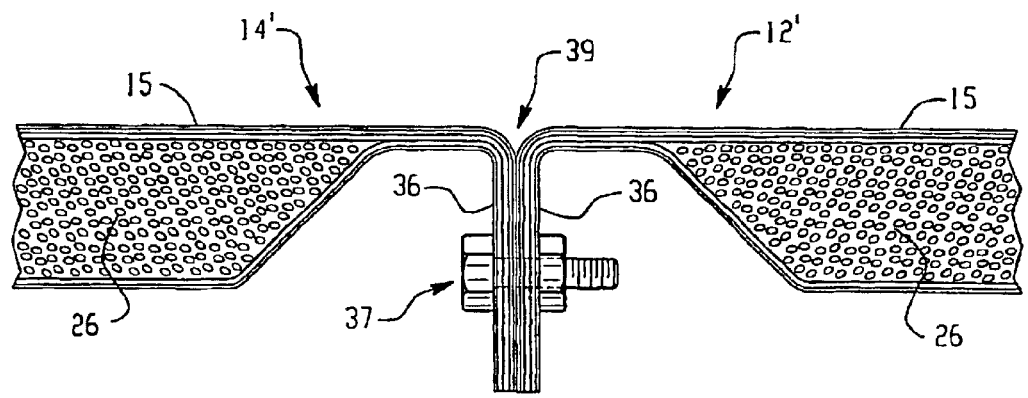
FIG. 6A is an enlarged view of Section A in FIG. 6.
Figure 6B:
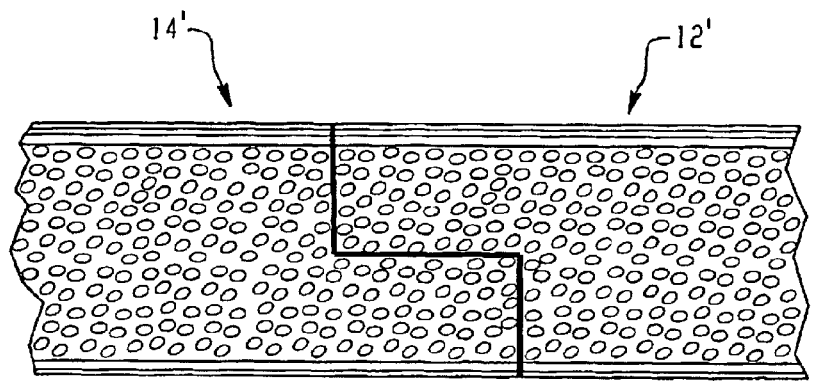
FIG. 6B is an enlarged view of an alternate joint for the joint depicted in FIG. 6A.
Figure 6C:
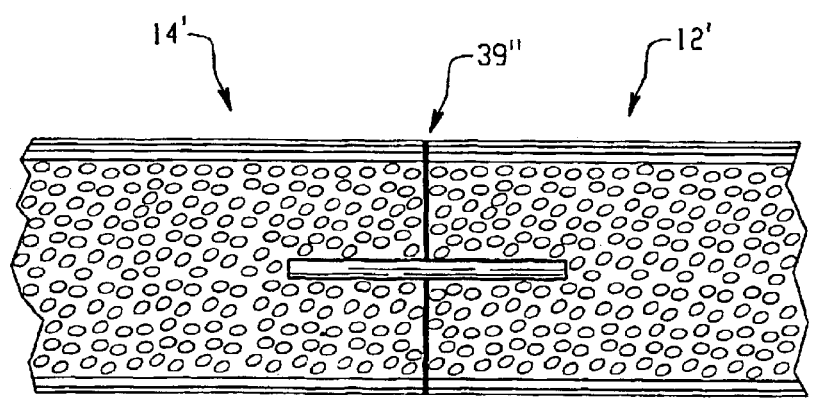
FIG. 6C is an enlarged view of yet another alternate joint for that depicted in FIG. 6A.
Figure 6D:
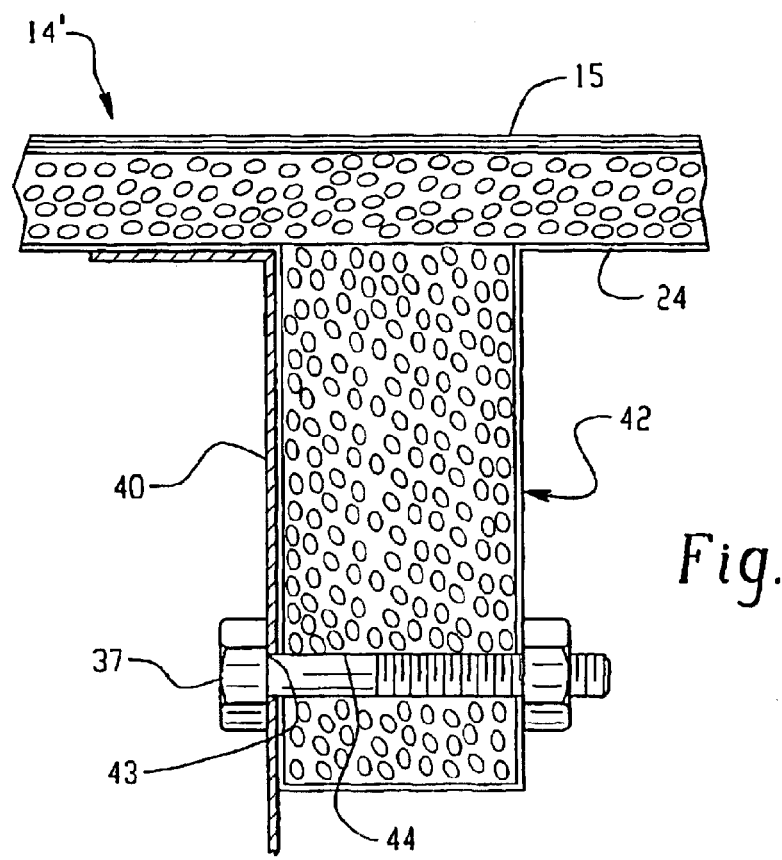
FIG. 6D is an enlarged view of Section D in FIG. 6.
Figure 6E:
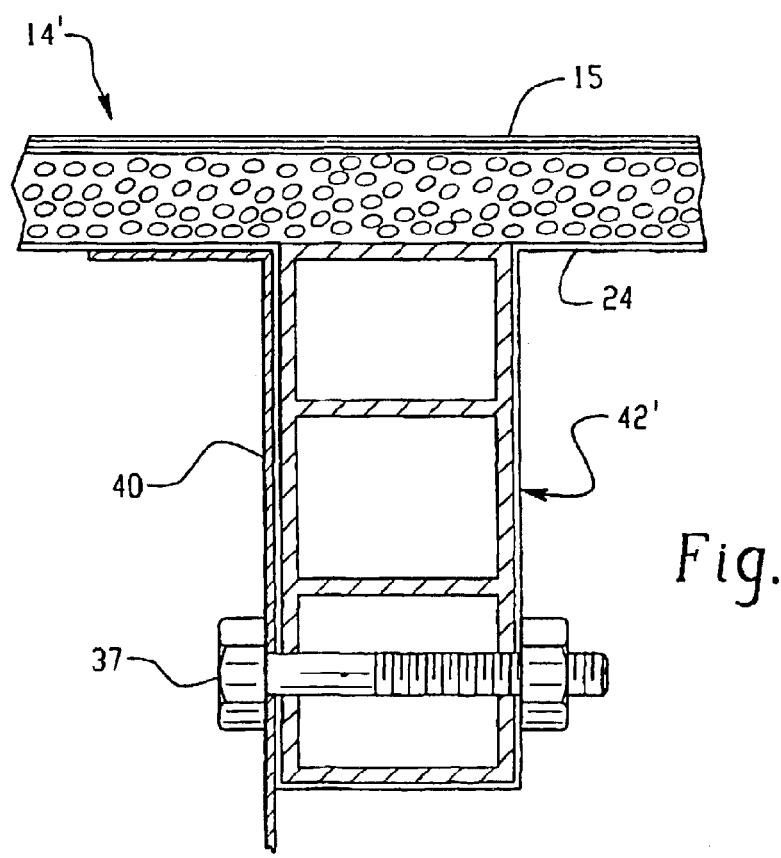
FIG. 6E is an enlarged view of an alternate longitudinal stiffener joint for that depicted in FIG. 6D

Referring now to FIGS. 6, 6D and 6E, a utility base section 40 that can be fitted with a floor sweeper mechanism, process air, electrical services and other process requirements (not shown) is provided for the assembled canopy halves 12', 14' to be supported atop. Each canopy half 12', 14' can have a longitudinal beam 42, 42' connected to an underside of their respective floor portions 19, either attached exteriorly, such as with epoxy, or the longitudinal beams 42, 42' can be integral with the floor portions 19, as shown in FIGS. 6D and 6E. As illustrated, longitudinal beams 42, 42' are placed in the lay-up, as described supra, prior to the SCRIMP or other resin infusion process and curing. The longitudinal beams can be placed in the lay-up directly atop the core material layer 26 and before and under the second layer of bi-directional glass fabric 24. The longitudinal beams offer strength and structural rigidity and may be comprised of any suitable material, such as high density foam (FIG. 6D), glass fiber reinforced foam or a pultruded glass hollow box beam section 42' (FIG. 6E). Aligned holes 43 in the utility base 40 and 44 in the longitudinal beams 42, 42' can be secured together with a standard bolted connection. Bolt holes 44 in the beams 42, 42' could be drilled during installation to match corresponding pre-drilled holes 43 in utility base 40 that can be spaced along the length of utility base 40.

The floor portions 19 are integral with the canopy halves 12', 14' for this inventive booth 10' embodiment. Therefore, there is only one floor seam instead of two, as was required in booth 10 to connect each sidewall 16 to the floor 30. The respective floor portions 19 of canopy halves 12', 14' each additionally have a ninety degree, downwardly extending mating flange 36 (see FIG. 6A) that is similar to flange 31, as described supra. These flanges are created by the lay-up of material layers 20, 22, and two layers of 24 around corner 58 on floor mold section 57. The opposed mating flanges 36 of canopy halves 12', 14' are connected together for the assembled booth 10', such as by bolted connections through corresponding holes along the respective flanges 36 (see FIG. 6A). Alternatively and not shown, opposed mating flanges 36 could be bonded or clamped to each other. For example, to further reduce the floor seam 39, a bonded shiplap type of joint could be established (FIG. 6B) or a bonded continuous glass fiber (G-10) spline joint (FIG. 6C) could be used to connect the respective floor portions 19 of canopy halves 12', 14'. Either of these alternative joints can be prepared during secondary operations. It will be appreciated by those of skill in the art that other joints known in the mechanical and structural arts may be equally suitable and it is intended that these are within the scope of this disclosure as well. Additionally, at the booth ends a pair of vestibule ends 32 or aperture bulkheads 33 can connect with perimeter flanges 21" that are at the respective canopy half 12', 14' edges, as at ceiling portions 18, sidewalls 16 and floor portions 19. Of course, it will be appreciated that one canopy end can be a vestibule end 32, whereas the opposite end can consist of an aperture bulkhead 33. With integral floor portions 19 connected to sidewalls 16 through a radius 38 and only one seam connecting composite canopy halves 12', 14', as at opposed flanges 36 connected with bolts 37 (FIG. 6A), there is less oversprayed powder particle adhesion to surface 15' in electrostatic coating operations. Using such a singular floor joint, the time to clean booth 10' during a color change operation is significantly reduced.

Since canopy halves 12', 14' additionally have floor portions 19 integral to each of them, wherein floor portions 19 can be connected to the respective sidewalls 16 through a radius 38, a different set-up tool must be used. Referring now to FIG. 8, set-up tool 54 can be used to load, infuse and cure canopy halves 12', 14' using the SCRIMP or other resin-infusion process. Set-up tool 54 has widths W', W" and a length L as shown, and comprises a roof mold section 55, a wall mold section 56, and a floor mold section 57. Width W' is slightly greater than the width W" such that the booth halves 12', 14', when assembled into booth 10', will include conveyor slot 34. Conveyor slot 34 can be on the order of four inches, or so, and is typical of conveyor slot openings known in powder coating spray booths. As such, W' can be about two inches greater than W", for example. Since the mold sections 55, 56, 57 are connected together, such as by bolting them (details not shown), the resulting seams, or joints, between mold sections should be dressed, such as with a tooling wax as is known in the art.

Tool 54 can be made expandable by using wall sections of varying lengths, to change the overall length L. Similarly, tool 54 can be expandable for either or both widths W' and W" by connecting an optional expander section 59 to the roof mold section 55 and floor mold section 57 of tool 54 as desired. Expander sections 59 can be bolted, as at surfaces 51 and 53, with the resulting joint or seam treated with tooling wax prior to use. Obviously, it will be appreciated that a variety of differently sized expander sections 59 would allow numerous widths W' and W" for canopy sections 12', 14'.

A method for assembling a powder coating spray booth 10' is also provided. The method has few steps and assembly time is much less than conventional, exterior frame-supported spray booths. A utility base 40 is provided and placed where desired. The pair of nonconductive, preferably non-metallic, self-supporting, composite canopy halves 12', 14' are provided at the assembly site. The canopy halves 12', 14' are connected together, such as at the perimeter floor edge flanges 36 with bolts 37 (FIG. 6A), and the assembly is placed atop the utility base 40. The utility base can be connected to the assembled canopy halves 12', 14' such as with bolts 44 through corresponding holes 43, 44 in the utility base 40 and the support beams 42 of the canopy halves 12', 14', respectively (FIGS. 6D, 6E). One or a pair of either vestibule ends 32 or aperture bulkheads 33, or one each vestibule end 32 and aperture bulkhead 33 per respective booth 10' end, can be provided and connected to respective perimeter edge flanges 21" of the ceiling portions 18, the sidewalls 16 and the floor portions 19 of each of the canopy halves 12', 14'.

An alternative embodiment for the inventive spray booth 10" is illustrated in FIG. 9. Booth 10" comprises canopy halves 12", 14" each comprising integral ceiling portions 18", sidewalls 16" and floor portions (not shown, but similar to 19 in FIG. 2) and each further including an integral portion of either or both end units. The end units can be either aperture bulkhead ends (such as 33 in FIG. 1) or vestibule type end units 32' (shown with both ends being vestibule type end units 32'). Of course, one end can be a vestibule type end unit 32' whereas the opposed end unit can be an aperture bullhead (such as 33 in FIG. 1). A different tool (not shown) with corresponding mold surface would be required. This could further minimize the conductivity and assembly time of the resulting electrostatic powder coating spray booth 10". Booth 10" could be made with the same materials and layers using the SCRIMP or other resin-infusion process, as described above for canopy halves 12, 14, 12' and 14', and is structurally self-supporting, non-conductive, and preferably, completely non-metallic. Since there are is only one seam, oversprayed electrostatically charged powder particle adhesion to the interior booth canopy surfaces is substantially reduced. Booth 10" can have one or more operational and access openings 11, 11', 11" such as for automatic or manual electrostatic spray gun openings 11, 11' and a service door 11" for worker entry into the booth 10". A conveyor slot opening 34' can be provided for conveying parts 70 through the booth 10" to be spray coated therein. The overhead conveyor 62 can have part holders 64, as is known in the art. Canopy halves 12", 14" could be connected together, such as with bolted connections (not shown), and further bolted (not shown) to a utility base 40'.

The invention has been described herein with reference to the preferred embodiments. Obviously, modifications and alterations will occur to others upon a reading and understanding of this specification. It is intended to include all such modifications and alterations insofar as they come within the scope of the appended claims or the equivalents thereof.

I claim:

1. A powder spray coating booth, comprising at least one spray booth wall portion, wherein each wall portion comprises a first layer of reinforcing material, a second layer of core material adjacent to the first layer, a third layer of reinforcing material adjacent to the second layer, and resin, the resin binding the first, second, and third layers together thereby forming a composite structure; wherein each wall portion further comprises a fourth layer of resin, said fourth layer of resin adjacent to said first layer and forming an interior surface of the spray booth.

2. The spray booth of claim 1 wherein said core material comprises a closed cell foam.

3. The spray booth of claim 1 further comprising a veil layer between said first and fourth layers.

4. The spray booth of claim 3 wherein said veil layer comprises chopped strand mat.

5. The spray booth of claim 1 further comprising a fifth layer of unreinforced resin adjacent to said third layer of reinforcing material and forming an outer surface of the spray booth.

6. A wall section for a powder coating booth, comprising a first layer of reinforcing material, a second layer of core material adjacent to the first layer, a third layer of reinforcing material adjacent to the second layer, and resin, the resin binding the first, second, and third layers together thereby forming a composite structure; wherein the wall section further comprises a fourth layer of resin, said fourth layer of resin adjacent to said first layer and forming an interior surface of the wall section.

7. The wall section of claim 6 wherein said fourth layer comprises an unreinforced resin layer.

8. The wall section of claim 6 wherein said fourth layer comprises gelcoat.

9. The wall section of claim 6 wherein said core material comprises a closed cell foam.

10. The wall section of claim 6 further comprising a veil layer between said first and fourth layers.

11. The wall section of claim 10 wherein said veil layer comprises chopped strand mat.

12. The wall section of claim 6 further comprising a fifth layer of unreinforced resin adjacent to said third layer of reinforcing material and forming an outer surface of the wall section.

* * * * *